(12) United States Patent
Harrop et al.

(10) Patent No.: US 11,491,520 B1
(45) Date of Patent: Nov. 8, 2022

(54) COUPLER FOR LANDFILL TARP WEIGHT SYSTEM

(71) Applicant: Con-Wal, Inc., Rogers, AR (US)

(72) Inventors: Shannon Dean Harrop, Springdale, AR (US); James Alan Hughes, Monett, MO (US)

(73) Assignee: Con-Wal, Inc., Rogers, AR (US)

( * ) Notice: Subject to any disclaimer, the term of this patent is extended or adjusted under 35 U.S.C. 154(b) by 12 days.

(21) Appl. No.: 17/321,862

(22) Filed: May 17, 2021

(51) Int. Cl.
 *B09B 5/00* (2006.01)
 *F16G 15/00* (2006.01)
 *B09B 1/00* (2006.01)
 *F16B 5/02* (2006.01)
 *A01G 13/02* (2006.01)

(52) U.S. Cl.
 CPC ............... *B09B 1/004* (2013.01); *F16B 5/02* (2013.01); *F16G 15/00* (2013.01); *A01G 13/0287* (2013.01)

(58) Field of Classification Search
 CPC .......... B09B 1/004; F16G 15/00; F16B 15/02; A01G 13/0287
 See application file for complete search history.

(56) References Cited

U.S. PATENT DOCUMENTS

| | | | |
|---|---|---|---|
| 1,106,624 A | 8/1914 | Cadwallader et al. | |
| 2,413,061 A | 12/1946 | McKee et al. | |
| 2,754,900 A | 7/1956 | Karobonik et al. | |
| 3,301,498 A | 1/1967 | Greding | |
| 3,481,556 A | 12/1969 | McDonnell | |
| 4,050,972 A | 9/1977 | Cardinal, Jr. | |
| 4,068,404 A | 1/1978 | Sheldon | |
| 4,084,763 A | 4/1978 | Zamboni | |
| 4,455,790 A | 6/1984 | Curie | |
| 4,578,908 A | 4/1986 | Ishler | |
| 4,590,714 A | 5/1986 | Walker | |
| 4,927,317 A | 5/1990 | Acosta | |
| 5,180,203 A | 1/1993 | Goudy | |
| 5,291,698 A | 3/1994 | Rayner, Jr. | |
| 5,304,014 A | 4/1994 | Slutz | |
| 5,535,955 A | 7/1996 | Enger et al. | |

(Continued)

FOREIGN PATENT DOCUMENTS

| CN | 205312715 | 6/2016 |
|---|---|---|
| CN | 110436266 | 11/2019 |

(Continued)

*Primary Examiner* — Benjamin F Fiorello
(74) *Attorney, Agent, or Firm* — Head, Johnson, Kachigian & Wilkinson, PC (57) ABSTRACT

A weight system for a landfill tarpaulin. A pair of parallel chains are retained within a pair of sleeves in the tarp. A plurality of parallel wire lines traverse the tarpaulin. A plurality of elongated coupler bodies are provided with each coupler body having a first end terminating in an eyelet, a second, opposed end terminating in a hollow recess, and an attached threaded protrusion to the underside of the body. A chain fastener passes through one eyelet, passes through one of the links of the chain, and passes through the sleeve of the tarp. A tarp fastener passes through a washer, passes through the tarp, passes through an optional washer, and is threadably connected to the elongated coupler body. Each end of the wire lines is received and held in place by the hollow recess.

11 Claims, 8 Drawing Sheets

(56) References Cited

U.S. PATENT DOCUMENTS

| | | | |
|---|---|---|---|
| 5,536,116 | A | 7/1996 | Lammers et al. |
| 5,630,735 | A | 5/1997 | Eckert |
| 5,660,402 | A | 8/1997 | Jones et al. |
| 5,692,491 | A | 12/1997 | Christensen et al. |
| 5,765,901 | A | 6/1998 | Wilkens |
| 6,007,138 | A | 12/1999 | Cramaro |
| 6,142,554 | A | 11/2000 | Carroll et al. |
| 6,145,778 | A | 11/2000 | Tuominen et al. |
| 6,264,400 | B1 | 7/2001 | Gent |
| 6,299,094 | B1 | 10/2001 | James, Jr. |
| 6,502,890 | B1 | 1/2003 | Fliege et al. |
| 6,558,079 | B1 | 5/2003 | Kozak et al. |
| 6,558,080 | B2 | 5/2003 | Kozak |
| 6,575,393 | B1 | 6/2003 | James, Jr. |
| 6,786,676 | B1 | 9/2004 | Pitcher |
| 6,865,754 | B2 | 3/2005 | MacLean et al. |
| 6,981,734 | B2 | 1/2006 | Martin |
| 7,018,135 | B2 | 3/2006 | Kaul et al. |
| 7,367,606 | B2 | 5/2008 | Ellis |
| 7,404,582 | B2 | 7/2008 | Scartozzi et al. |
| 7,458,629 | B2 | 12/2008 | Smith et al. |
| 7,677,243 | B2 | 3/2010 | McClendon |
| 8,028,483 | B2 | 10/2011 | Carolan |
| 8,172,972 | B2 | 5/2012 | Carolan |
| 8,191,547 | B2 | 6/2012 | Pellegrino |
| 8,205,393 | B1 | 6/2012 | Harrop et al. |
| 8,375,643 | B1 | 2/2013 | Harrop et al. |
| 8,572,901 | B2 * | 11/2013 | Holstrom .............. C05F 17/964 135/120.4 |
| 8,607,781 | B2 | 12/2013 | Hermann et al. |
| 8,777,516 | B2 * | 7/2014 | Slutz .................... B09B 1/004 160/264 |
| 8,784,007 | B2 | 7/2014 | Wilson |
| 8,863,741 | B2 | 10/2014 | MacKay et al. |
| 9,206,997 | B2 | 12/2015 | Ryan |
| D813,801 | S | 3/2018 | Wabel et al. |
| 10,499,571 | B2 | 12/2019 | Kitchen et al. |
| 2003/0124915 | A1 | 7/2003 | Kaine et al. |
| 2004/0107985 | A1 | 6/2004 | Weeks |
| 2004/0131454 | A1 | 7/2004 | Voghel |
| 2005/0211238 | A1 | 9/2005 | Archibald |
| 2006/0010783 | A1 | 1/2006 | Evans |
| 2006/0065182 | A1 | 3/2006 | Campbell et al. |
| 2006/0150537 | A1 * | 7/2006 | Baum .................... E04G 21/28 52/90.1 |
| 2007/0102951 | A1 | 5/2007 | Chenowth |
| 2007/0266644 | A1 | 11/2007 | Weicht |
| 2008/0141599 | A1 | 6/2008 | Akdag et al. |
| 2008/0277961 | A1 | 11/2008 | Smith et al. |
| 2008/0296186 | A1 | 12/2008 | Daun et al. |
| 2009/0013610 | A1 | 1/2009 | Glynos |
| 2009/0194095 | A1 | 8/2009 | Fairstein |
| 2010/0047020 | A1 | 2/2010 | Lacey |
| 2010/0074688 | A1 | 3/2010 | Renaud |
| 2010/0278592 | A1 | 11/2010 | Walker |
| 2011/0180058 | A1 | 7/2011 | MacKay et al. |
| 2011/0227363 | A1 | 9/2011 | Smith et al. |
| 2014/0137401 | A1 | 5/2014 | Lannert |

FOREIGN PATENT DOCUMENTS

| | | |
|---|---|---|
| DE | 3330897 | 3/1985 |
| DE | 19913750 | 10/2000 |
| EP | 197179 | 8/1992 |
| GB | 2278374 | 11/1994 |
| JP | 04281907 | 10/1992 |
| JP | 2000167506 | 6/2000 |
| JP | 2008143700 | 6/2008 |
| WO | 199950000 | 10/1999 |

\* cited by examiner

COUPLER FOR LANDFILL TARP WEIGHT SYSTEM

BACKGROUND OF THE INVENTION

1. Field of the Invention

The present invention relates to a weight system for a landfill tarp and to a coupler therefor. In particular, the present invention relates to an improved coupler for retaining chains and wire lines for an interconnected weight system that permits the weight system and tarpaulin to be wound and unwound from a spool or reel.

2. Related Art

Various types of tarpaulins from a variety of materials are utilized in a wide variety of applications.

Increasingly, government rules and regulations require landfills to be covered at the end of each day so that the debris is not exposed to the elements or subject to being blown by winds.

While it is possible to cover debris deposited in a landfill at the end of each day with a layer of soil, this requires a considerable amount of work each day.

Additionally, the soil cover reduces the amount of debris that can be placed in the landfill. Increasing cost and difficulty are encountered with siting, permitting and building landfills, so it is important to extend the useful life of landfills as long as possible.

Accordingly, it has become common place to cover the active site of a landfill with a tarpaulin at the end of each day and then remove the tarpaulin at the beginning of the next day. This can be done by personnel manually, although it requires personnel to climb over the debris and garbage, which can be time consuming and dangerous. Additionally, machines have been developed to wind the tarpaulin on a spool or reel at the beginning of the day and then unwind the tarpaulin from the spool or reel onto the landfill at the end of the day. For example, see U.S. Pat. No. 5,304,014 and U.S. Patent Publication No. 2004/0131454 for examples of machines developed for this purpose.

The landfill tarpaulins are often ballasted or weighted so they will not be blown by winds. Manually placing weights, such as tires, on top of the tarpaulin is possible although, again, this requires personnel and additional time at the landfill site.

The tarpaulins used in these operations, however, typically have a pair of chains running lengthwise along the length of the tarpaulin. The chains are retained in sleeves or pockets formed in the tarp along the edges. Periodically, a relatively stiff wire line or wire lines traverse the tarpaulin to weigh down the tarpaulin and prevent wind from moving the tarp. Steel cable up to 7/8" in diameter is used. The wire lines or cables may be spaced apart approximately 12 to 24 feet along the length of the tarp.

Traditionally, the wire lines or cables have been held captive within the sleeve by sewing or otherwise securing the ends of the sleeves. The wire lines or cables can punch through the sleeves of the tarp, allowing the cable to flail about, which can damage the tarp and vulnerable hydraulic hoses and components on the tarp winding machine.

Additionally, when the tarpaulin is wound on a spool, there is a tendency for the tarpaulin to bunch toward the center. When the tarpaulin is deployed, the bunched section results in a reduced coverage area.

Accordingly, there is a need for a weight system for a landfill tarpaulin which will include couplers to join the chains with the cables.

Additionally, there is a need for a coupler for a landfill tarpaulin which permits winding and unwinding from a spool or reel, which is less likely to damage the tarpaulin.

Moreover, there is a need for an interconnected weight system for a landfill tarpaulin, which will assist in deploying and winding the tarpaulin without bunching, but instead encourage and enable widespread coverage.

Applicant's prior U.S. Pat. Nos. 8,375,643 and 8,205,393 show examples of a flexible tarpaulin and a weight system therefor.

Notwithstanding the foregoing, there remains a need for a coupler for a landfill tarp weight system wherein the wire line is not fastened inside the cylinder of the coupler body and can rotate freely while still being trapped in the cylinder of the coupler body.

There also remains a need for a coupler for a landfill tarp weight system which is securely attached to the tarpaulin at more than one point such that the length of the coupler body remains substantially parallel to the wire lines.

SUMMARY OF THE INVENTION

The present invention is directed to a weight system for a landfill tarp and to a coupler therefor. The weight system includes a pair of parallel chains, each having a plurality of links, which are retained within a pair of sleeves which run along the entire length of the tarpaulin.

A plurality of parallel wire lines or cables periodically traverse the tarp between the chains. The wire lines or cables are each retained within a sleeve forming pockets for receipt of the wire lines.

The wire lines are held in place by a plurality of elongated couplers secured to the chains and secured directly to the tarp. An elongated coupler body has a first end terminating in an eyelet. The elongated coupler body also has a second, opposed end terminating in a hollow recess. A chain fastener composed of a threaded bolt and nut passes through the eyelet, passes through one of the links of the chains, and also passes through the sleeve of the tarp. Separately, the tarp is secured to the elongated coupler body with a bolt which passes through an optional washer and the tarp itself and is threadably connected to the underside of the elongated coupler body. The at least two points at which the elongated coupler body is secured to the tarp ensures that the coupler body remains substantially perpendicular to the chains.

As such, the ends of the wire lines traversing the tarp between the chains are received in the hollow recesses of the elongated coupler bodies.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
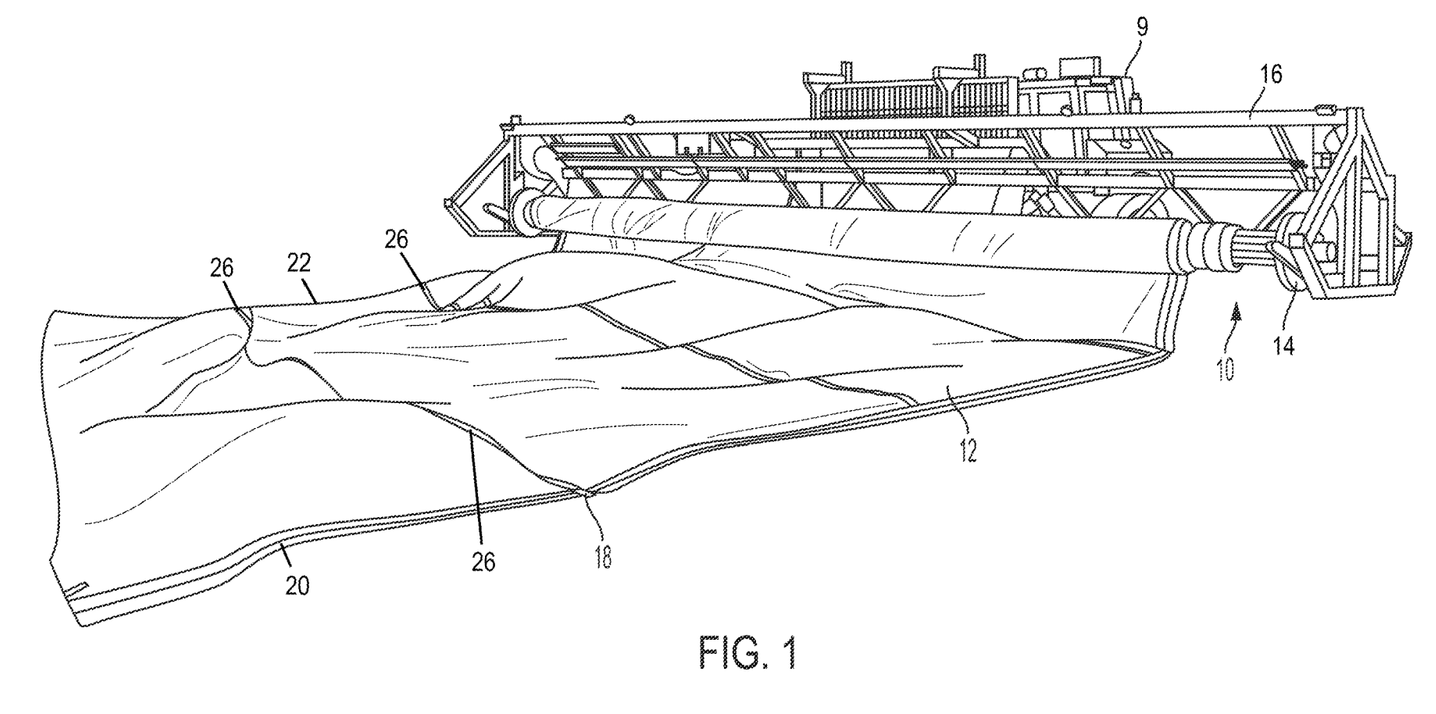
FIG. 1 illustrates a perspective view of a first preferred embodiment of the weight system for a landfill tarpaulin constructed in accordance with the present invention.

FIG. 1 illustrates a perspective view of an interconnected weight system 10 for a landfill tarp 12. The tarpaulin may be constructed of any flexible material, such as polypropylene. The tarpaulin may be any dimension, although 40 feet by 100 feet is typical. In the embodiment shown, the tarp 12 is connected at one end to a spool or reel 14 which is mounted for rotation on a framework 16. The spool is wound and unwound by hydraulic power and uses motive force from machinery 9, such as a bulldozer, backhoe, or other heavy equipment.

The weight system 10 includes a pair of parallel chains (to be described in detail), each having a plurality of links, which are retained within a pair of sleeves 20 and 22 which run along the edge of the tarpaulin 12. The sleeves 20 and 22 form pockets for receipt of the chains. The chains provide weight to prevent the tarp 12 from being blown or otherwise moved from the desired location.

As will be described in detail, a plurality of parallel wire lines (to be described in detail) periodically traverse the tarp between the chains within the sleeves 20 and 22. The wire lines are likewise retained in sleeves 26 forming pockets for receipt of the wire lines.

When the tarpaulin 12 is wound on the spool or reel 14, the parallel chains and traverse wire lines are also wound on the spool or reel.

Figure 2:
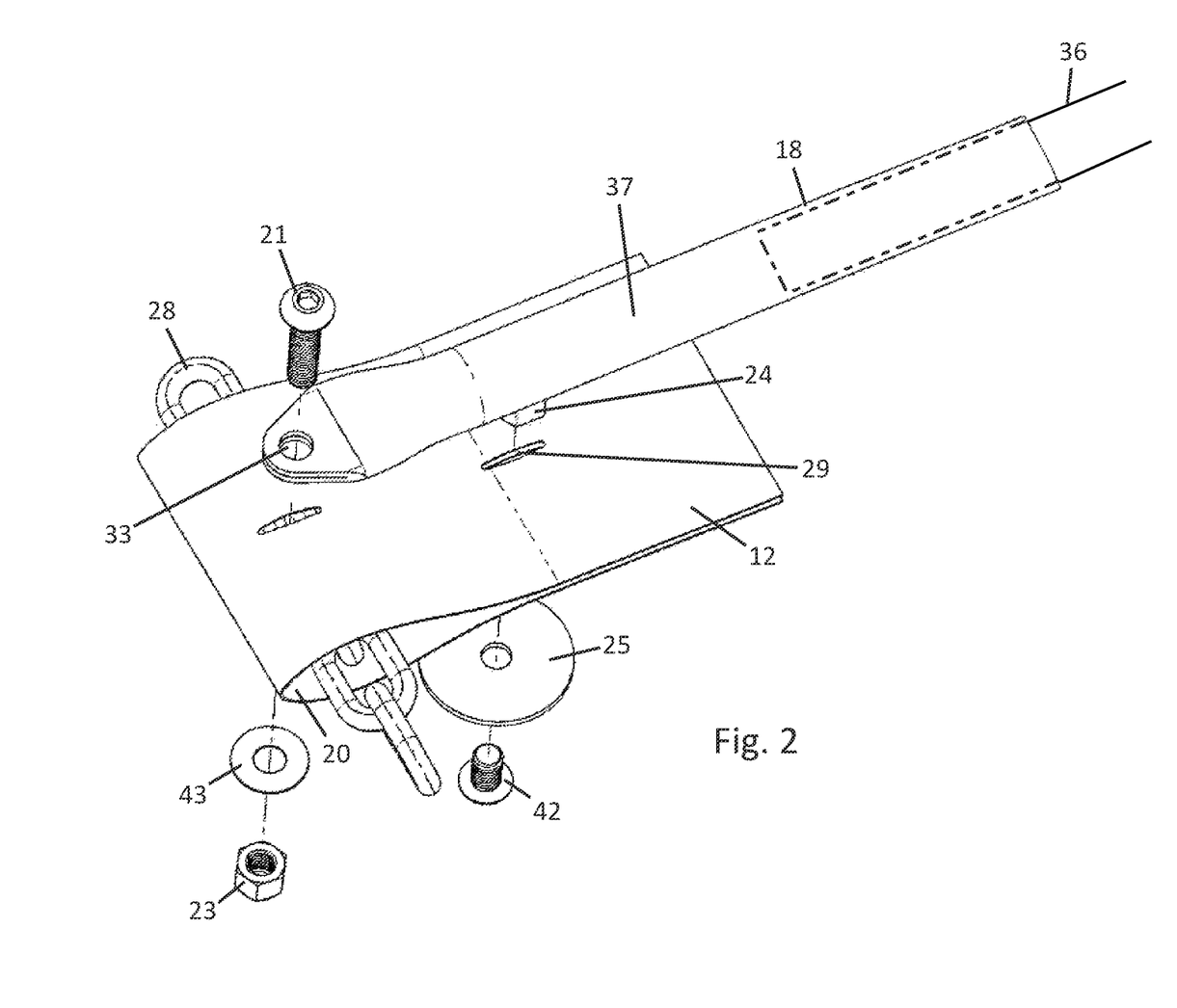
FIG. 2 is an exploded view of a first preferred embodiment of a coupler of the weight system for a landfill tarpaulin as shown in FIG. 1.

FIG. 2 illustrates a first preferred embodiment of the present invention. Wire lines 36 are secured to the chains by a plurality of elongated couplers 18, one of which is shown in FIG. 2. One of the chains 28 shown in FIG. 2 is retained within the sleeve 20 of the tarp. The wire line 36 is retained within the sleeve 26 of the tarp 12 (depicted in FIG. 1). Each of the wire lines 36 are substantially perpendicular to the chains 28.

An elongated coupler body 18 has a first end terminating in an eyelet 33. The elongated coupler body 18 also has a second, opposed end terminating in a hollow recess 37. A chain fastener passes through the eyelet 33, passes through one of the links of the chain 28, and also passes through the sleeve 20 of the tarp 12.

In the present embodiment, the chain fastener is composed of a threaded bolt 21, a washer 43, and a threaded nut 23, although other fasteners are possible within the spirit and scope of the invention.

Each end of wire line 36 is received and held in place by a hollow recess 37 of the elongated coupler bodies 18. The end of each wire line 36 is rotationally free to move within the recess of the body.

Additionally, the underside of the elongated coupler body 18 has the capability of being fastened directly to the tarp 12 via a tarp fastener. In the present embodiment, the tarp fastener is composed of a threaded bolt 42, a washer 25, an opening in the tarp 29, and a threaded protrusion affixed to the underside of the elongated coupler body 18. The combination of the chain fastener and the tarp fastener allow for the elongated coupler body to be held substantially perpendicular to the chains such that the elongated coupler body does not rotate about the chain fastener.

Figure 3:
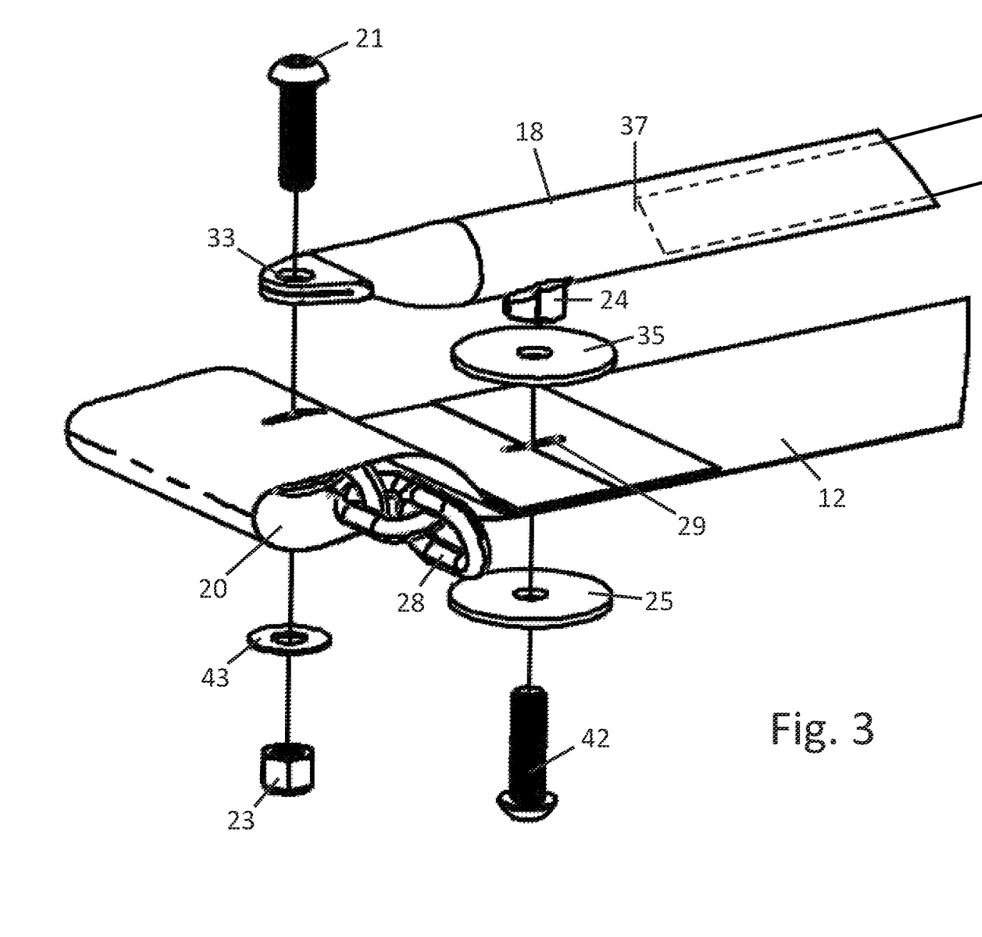
FIG. 3 is an exploded view of a second preferred embodiment of a coupler of the weight system for a landfill tarpaulin.

FIG. 3 illustrates a second preferred embodiment of the present invention. The second preferred embodiment of the invention places an optional washer 35 between the opening in the tarp 29 and the threaded protrusion 24 of the tarp fastener.

Figure 4:
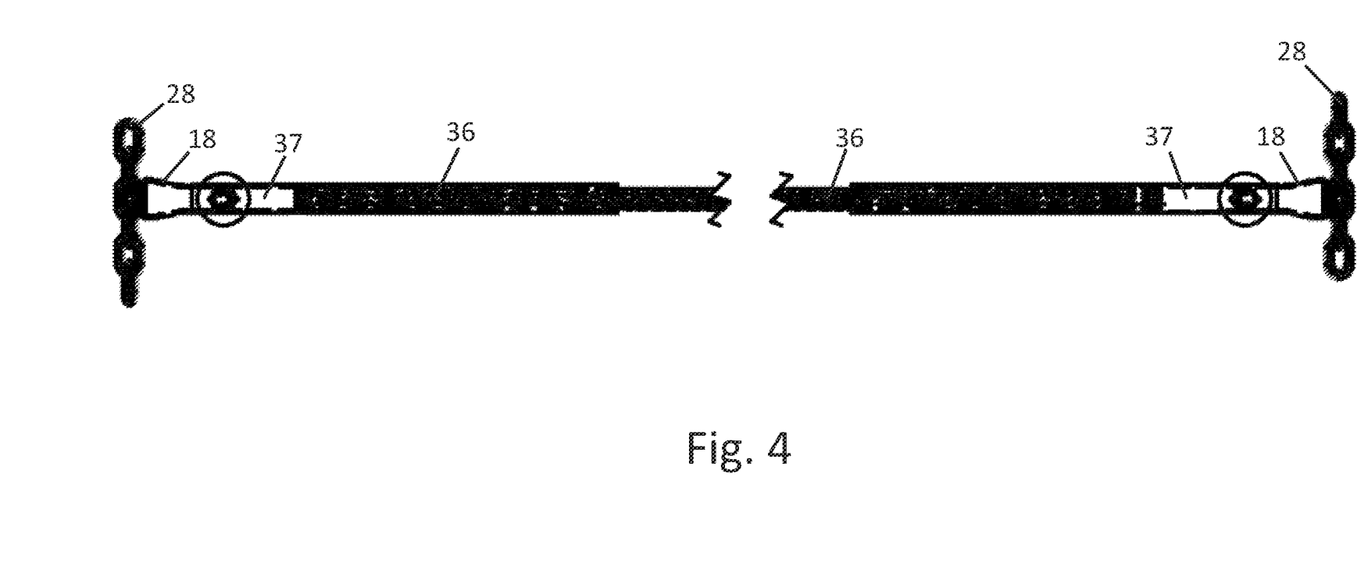
FIG. 4 is a bottom view of the weight system of FIG. 1 with the tarp removed for ease of viewing.

FIG. 4 illustrates a bottom view of how the wire lines 36 are received by the hollow recesses 37 of the coupler bodies 18 which are fastened to the chains 28.

Figure 5:
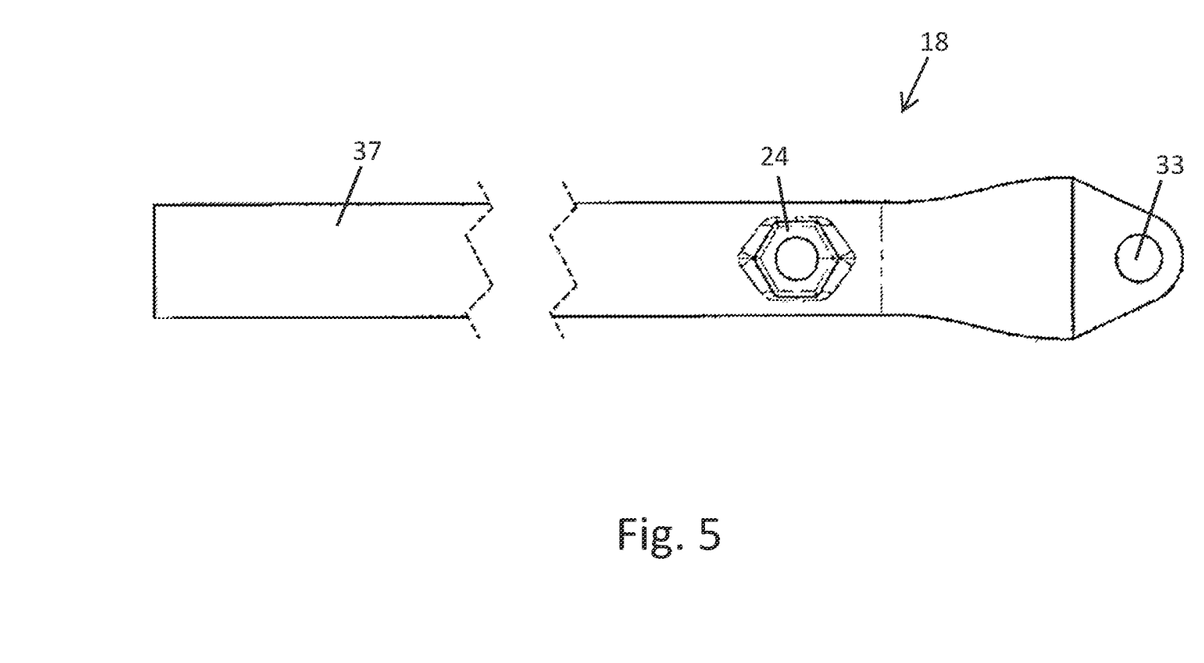
FIG. 5 is a bottom view of the coupler of the weight system of FIG. 1.

FIG. 5 is a bottom view of the elongated coupler body 18 illustrating the relative positions of the eyelet 33 to the threaded protrusion 24 of the tarp fastener to the hollow recess 37.

Figure 6:
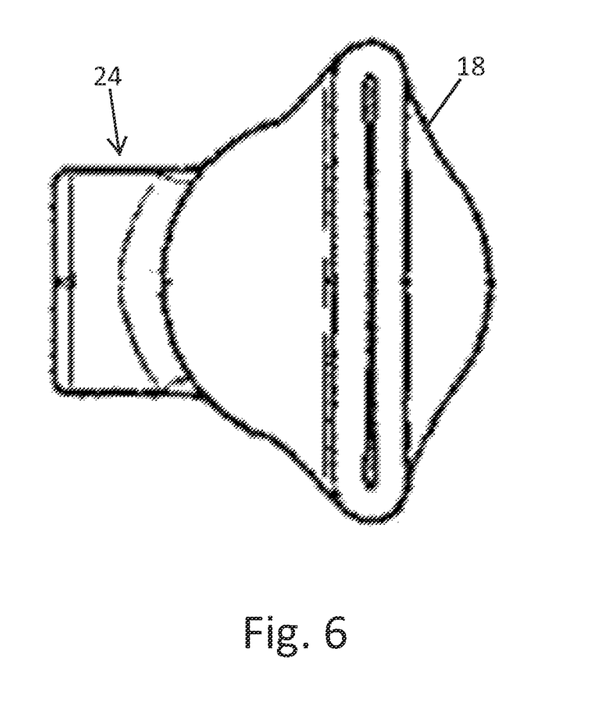
FIG. 6 is an end view of the coupler shown in FIG. 5.

FIG. 6 is an end view of the eyelet end of the elongated coupler body 18 showing the threaded protrusion 24 of the tarp fastener.

Figure 7:
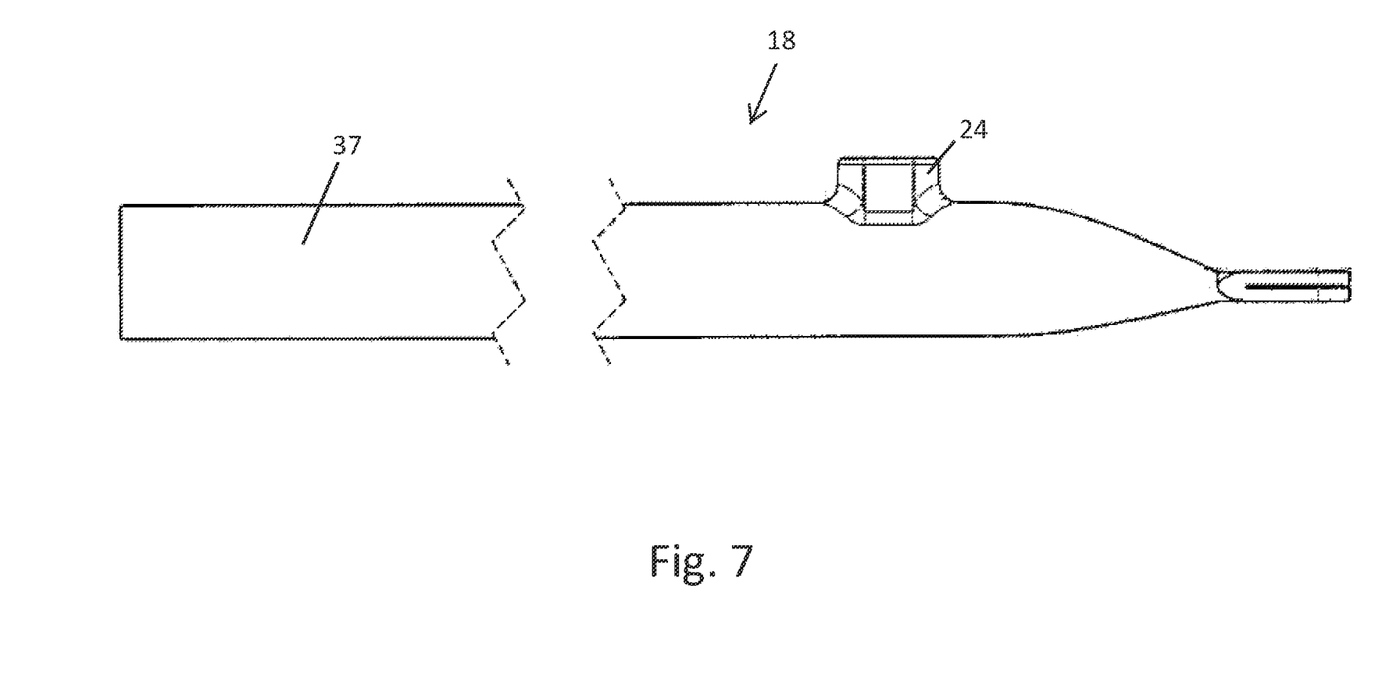
FIG. 7 is a side view of the coupler shown in FIG. 5.

FIG. 7 is a side view of the elongated coupler body 18 apart from the other components of the weight system.

Figure 8:
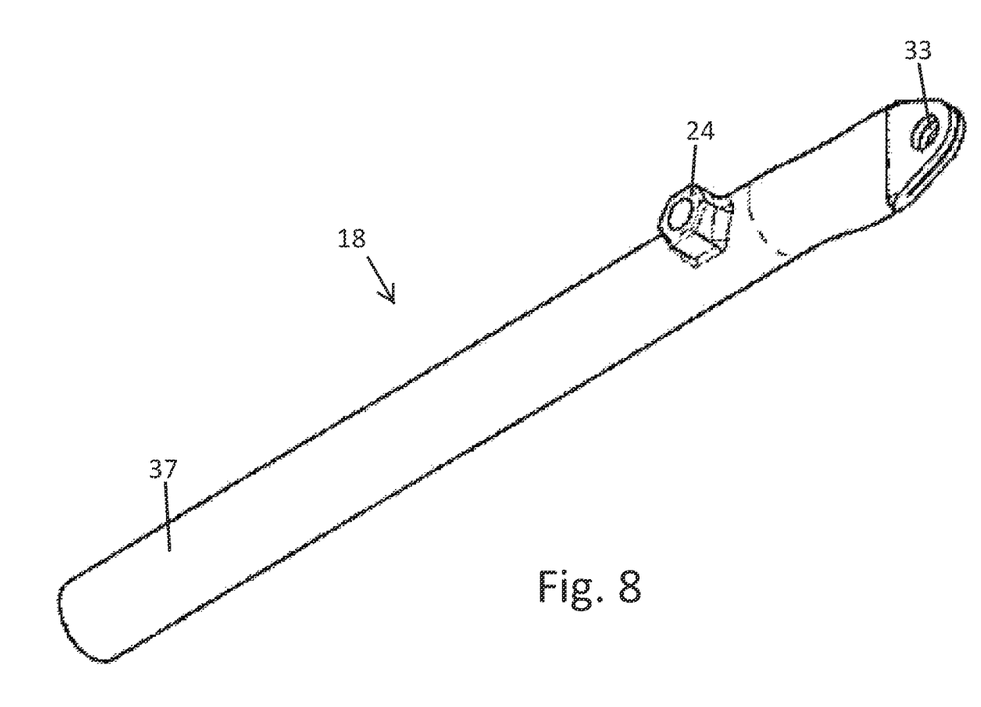
FIG. 8 is a perspective view of the coupler shown in FIG. 5.

FIG. 8 is a perspective view of the elongated coupler body 18 apart from the other components of the weight system.

Whereas, the invention has been described in relation to the drawings attached hereto, it should be understood that other and further modifications, apart from those shown or suggested herein, may be made within the scope of this invention.

What is claimed is:

1. A weight system for a landfill tarp, which comprises:
   a pair of parallel chains retained within a pair of sleeves in said tarp;
   a plurality of parallel wire lines traversing said tarp;
   a plurality of elongated coupler bodies, each elongated coupler body having a first end terminating in an eyelet and a second, opposed end terminating in a hollow recess;
   a fastener passing through said eyelet in said first end and connecting to said tarp, wherein said fastener passing through said eyelet connects directly or indirectly to one of said sleeves in said tarp for said chains; and
   a tarp fastener securing said elongated coupler bodies to said tarp at a point along said coupler bodies other than at said eyelet;
   wherein a portion of said parallel wire lines are received by said hollow recess.

2. The weight system for a landfill tarp as set forth in claim 1 wherein said tarp fastener includes a threaded protrusion on the underside of the elongated coupler body.

3. The weight system for a landfill tarp as set forth in claim 2 wherein said tarp fastener includes a threaded bolt passing through a washer, passing through the tarp, and being received by the threaded protrusion.

4. The weight system for a landfill tarp as set forth in claim 2 wherein said tarp fastener includes a threaded bolt passing through a washer, passing through the tarp, passing through a second washer, and being received by the threaded protrusion.

5. The weight system for a landfill tarp as set forth in claim 1 wherein each said coupler body first end is flattened.

6. The weight system for a landfill tarp as set forth in claim 1 wherein each of said plurality of parallel wire lines are in a sleeve of said tarp.

7. A coupler for a landfill tarp weight system, which coupler comprises:
- an elongated coupler body having a first end terminating in an eyelet and a second, opposed end terminating in a hollow recess;
- a chain fastener passing through said eyelet, passing through a chain with a plurality of links, where said chain fastener passes through one of said links, and passes through a tarp securing said coupler to said chain and said tarp; and
- a tarp fastener securing said coupler to said tarp at a point along said coupler other than at said eyelet;
- wherein hollow recess receives a wireline.

8. A coupler for a landfill tarp weight system as set forth in claim 7 wherein said tarp fastener includes a threaded protrusion on the underside of the elongated coupler body.

9. A coupler for a landfill tarp weight system as set forth in claim 8 wherein said tarp fastener includes a threaded bolt passing through a washer, passing through the tarp, and being received by the threaded protrusion.

10. A coupler for a landfill tarp weight system as set forth in claim 8 wherein said tarp fastener includes a threaded bolt passing through a washer, passing through the tarp, passing through a second washer, and being received by the threaded protrusion.

11. A coupler for a landfill tarp weight system as set forth in claim 7 wherein said coupler body first end is flattened.

\* \* \* \* \*